United States Patent
Weakley (10) Patent No.: US 12,367,365 B2
(45) Date of Patent: Jul. 22, 2025

(54) INLINE TESTING OF RFID INLAYS

(71) Applicant: CHECKPOINT SYSTEMS, INC., Thorofare, NJ (US)

(72) Inventor: Thomas Craig Weakley, Simpsonville, SC (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 18/034,097

(22) PCT Filed: Oct. 28, 2021

(86) PCT No.: PCT/US2021/057015
§ 371 (c)(1),
(2) Date: Apr. 27, 2023

(87) PCT Pub. No.: WO2022/094053
PCT Pub. Date: May 5, 2022

(65) Prior Publication Data
US 2023/0394270 A1    Dec. 7, 2023

Related U.S. Application Data

(60) Provisional application No. 63/106,515, filed on Oct. 28, 2020.

(51) Int. Cl.
*G06K 19/07* (2006.01)
*G06K 7/10* (2006.01)

(52) U.S. Cl.
CPC ..... *G06K 19/0722* (2013.01); *G06K 7/10356* (2013.01)

(58) Field of Classification Search
None
See application file for complete search history.

(56) References Cited

U.S. PATENT DOCUMENTS

| 7,701,223 B2 * | 4/2010 | Kohla ............ G01R 29/10 |
| | | 455/562.1 |
| 9,569,714 B2 * | 2/2017 | Marcus ........... G06K 19/0722 |
| 2005/0093679 A1 | 5/2005 | Zai et al. |
| 2005/0223286 A1 | 10/2005 | Forster |
| 2006/0145710 A1 | 7/2006 | Puleston et al. |

(Continued)

OTHER PUBLICATIONS

Patent Cooperation Treaty (PCT), International Search Report and Written Opinion for Application PCT/US2021/057015 filed Oct. 28, 2021, mailed Jan. 31, 2022, International Searching Authority, US.

*Primary Examiner* — Thien M Le
*Assistant Examiner* — April A Taylor
(74) *Attorney, Agent, or Firm* — McDonald Hopkins LLC (57) ABSTRACT

This disclosure relates to inline testing of RFID inlays. A test system includes a test interface without moving parts and a marking device. The test interface an array of antennas, a radio frequency identification (RFID) reader to interrogate RFID inlays to be tested; and a circuit configured to selectively connect the RFID reader to the antenna in the array of antenna. The test interface performs a primary scan of all of the RFID inlays to be tested and, when not all of the RFID inlays respond, a secondary scan to determine which of the RFID inlays failed to respond. The marking devices mark any of the identified RFID inlays that failed to respond.

23 Claims, 6 Drawing Sheets

(56) References Cited

U.S. PATENT DOCUMENTS

| | | | |
|---|---|---|---|
| 2006/0226982 A1* | 10/2006 | Forster | G06K 7/10465 |
| | | | 340/572.1 |
| 2006/0226983 A1* | 10/2006 | Forster | G06K 7/0008 |
| | | | 340/572.1 |
| 2009/0167502 A1 | 7/2009 | Erickson et al. | |
| 2010/0171599 A1 | 7/2010 | Chang | |
| 2010/0271210 A1 | 10/2010 | Nogami et al. | |
| 2012/0274448 A1 | 11/2012 | Marcus et al. | |
| 2015/0015366 A1 | 1/2015 | Hoffman | |
| 2018/0109331 A1 | 4/2018 | Nikitin et al. | |

* cited by examiner

FIG. 6

INLINE TESTING OF RFID INLAYS

CROSS-REFERENCE TO RELATED APPLICATION

This application is a 35 U.S.C. § 371 national stage application of PCT Application No. PCT/US2021/057015 filed on Oct. 28, 2021, entitled "INLINE TESTING OF RFID INLAYS" which claims priority of U.S. Provisional Patent App. No. 63/106,515 entitled, "INLINE TESTING OF RFID INLAYS," filed Oct. 28, 2020, each of which are hereby incorporated by reference in their entireties.

TECHNICAL FIELD

The present invention is generally related to radio frequency identification (RFID) labels and, more specifically, inline testing of RFID labels.

BACKGROUND

Cost is often a barrier to entry in the RFID industry. Component suppliers and manufacturers are under constant pressure to reduce cost. One approach to reducing manufacturing cost is to increase the throughput. During the inlay assembly process, bonding the IC to the antenna has typically been the bottleneck. As assembly processing speeds increase and faster cure anisotropic conductive adhesives are developed, the bottleneck is increasingly becoming the radio frequency (RF) test system which guarantees product quality.

SUMMARY

A testing system with an radio frequency identification (RFID) label (sometimes referred to as "inlay") testing interface without moving parts to determine when an inlay is not performing according to quality control standards. The testing system includes a test interface that has no moving parts. The test interface includes an array of antennas, each referenced by its location within the array. The antennas are connected to test circuitry that facilitates the test interface querying the RFID inlay being tested in different patterns to determine which, if any, of the RFID inlay being tested are defective (sometimes referred to as being "bad") without any of the antennas moving.

An example test system includes a test interface without moving parts and a marking device. The test interface an array of antennas, a radio frequency identification (RFID) reader to interrogate RFID inlays to be tested; and a circuit configured to selectively connect the RFID reader to the antenna in the array of antenna. The test interface performs a primary scan of all of the RFID inlays to be tested and, when not all of the RFID inlays respond, a secondary scan to determine which of the RFID inlays failed to respond. The marking devices mark any of the identified RFID inlays that failed to respond.

An example method to test radio frequency identification (RFID) inlays includes moving the RFID inlays to be tested into a test interface including an array of antennas. The example method also includes performing, by the test interface, a query off all of the RFID inlays to be tested without moving any of the antennas and without associating any response from the RFID inlays to any of the antennas. Additionally, the example method includes (i) in response to receiving responses from all of the RFID inlays to be tested, determining that all of the RFID inlays to be tested are functional and (ii) in response to receiving responses from less than all of the RFID inlays to be tested; performing a secondary scan to determine which of the RFID inlays are defective. The example method includes marking the inlays that are defective.

An example method includes moving radio frequency identification (RFID) labels to be tested into a test interface that includes a two-dimensional array of antennas. The example method also includes performing, by the test interface, a query off all of the RFID labels to be tested without moving any of the antennas and without associating any response from the RFID labels to any of the antennas. The method includes in response to receiving responses from all of the RFID labels to be tested, determining that all of the RFID labels to be tested are not defective. Additionally, the example method includes in response to receiving responses from less than all of the RFID labels to be tested (i) interrogating multiple subsets of the RFID labels to be tested to determine which of the RFID labels are defective, each of the subsets including multiple of the RFID labels to be tested, (ii) for each of the subsets for which the test interface does not receive responses from all of the RFID inlays in the subset, recording all of the RFID inlays in the subset as having a failure, and (iii) after all of the subsets are tested, comparing a number of times the RFID inlay has been recorded as having a failure to a failure threshold, and determining that the RFID inlay is defective when the number of times the RFID inlay has been recorded as having a failure meets or exceeds the failure threshold. The example method includes marking the inlays that are defective.

BRIEF DESCRIPTION OF THE DRAWINGS

Operation of the present disclosure may be better understood by reference to the following detailed description taken in connection with the following illustrations, wherein.

DETAILED DESCRIPTION

In addition to increasing throughput by using faster curing adhesives, RFID integrated circuit (IC) manufacturers are addressing cost by moving away from the typical silicon manufacturing processes and implementing new processes which can produce RFID ICs which are physically much smaller than their predecessors. Since the process is relatively new, the inline test systems need to be more robust to guarantee inlay quality. An inlay is an antenna bonded to a polyethylene terephthalate (PET) layer that is eventually adhered to the back side of a label to be printed and encoded in an RFID printer (e.g., to produce a "smart label"). Currently, a test system for the inlays is located after the final bonder during inlay manufacturing process. Often, current testers test a two-dimensional matrix (e.g., multiple rows and columns) of inlays as they move through the manufacturing process. A tester may have two test interfaces (e.g., antennas) which move on an x-y platform in a "zig-zag" pattern and read the inlay's EPC number at a specified frequency and power level. A typical test cycle tests 24 inlays. Since there are two antennas, the tester performs 12 movements and 24 tests during the test cycle. An ink marking system, also on an x-y platform located above the web and marks inlays which failed the "read" test. The time to test and mark inlays is typically 6 seconds with the majority of the time allocated to the movement of the test interface.

As described below, to reduce testing time, a testing system where the test interface of the testing system has no moving parts. The test interface includes an array of antennas, each referenced by its location within the array. In some examples, the test interface includes an array of twenty-four antennas. The antenna may be identified by its location in the 2-dimensional array (e.g., "Antenna 1-1" for the antenna in in the first row of the first column) or by a number assigned to the antenna (e.g., the first antenna may be "Antenna 1" and the last antenna may be "Antenna 24").

Figure 1:
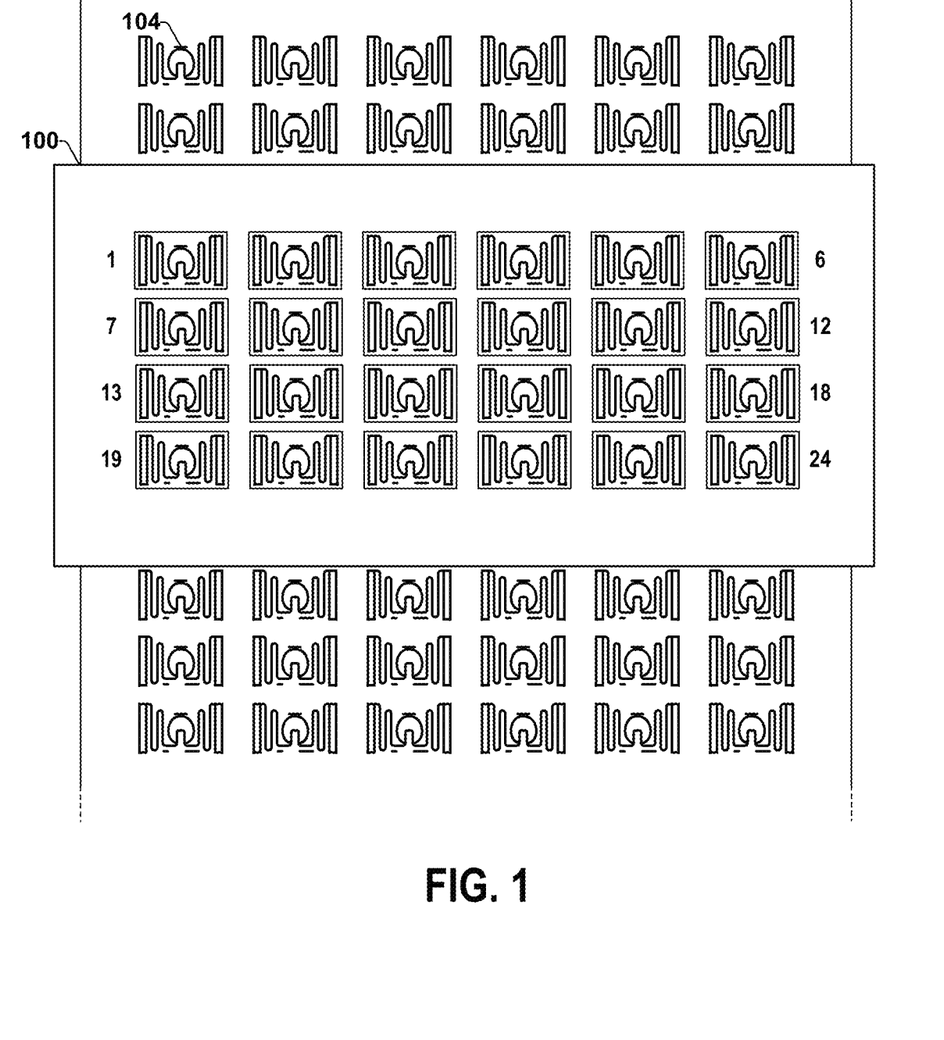
FIG. 1 is a conceptual diagram illustrating an example test interface operating in accordance with teachings of this disclosure.
Figure 2:
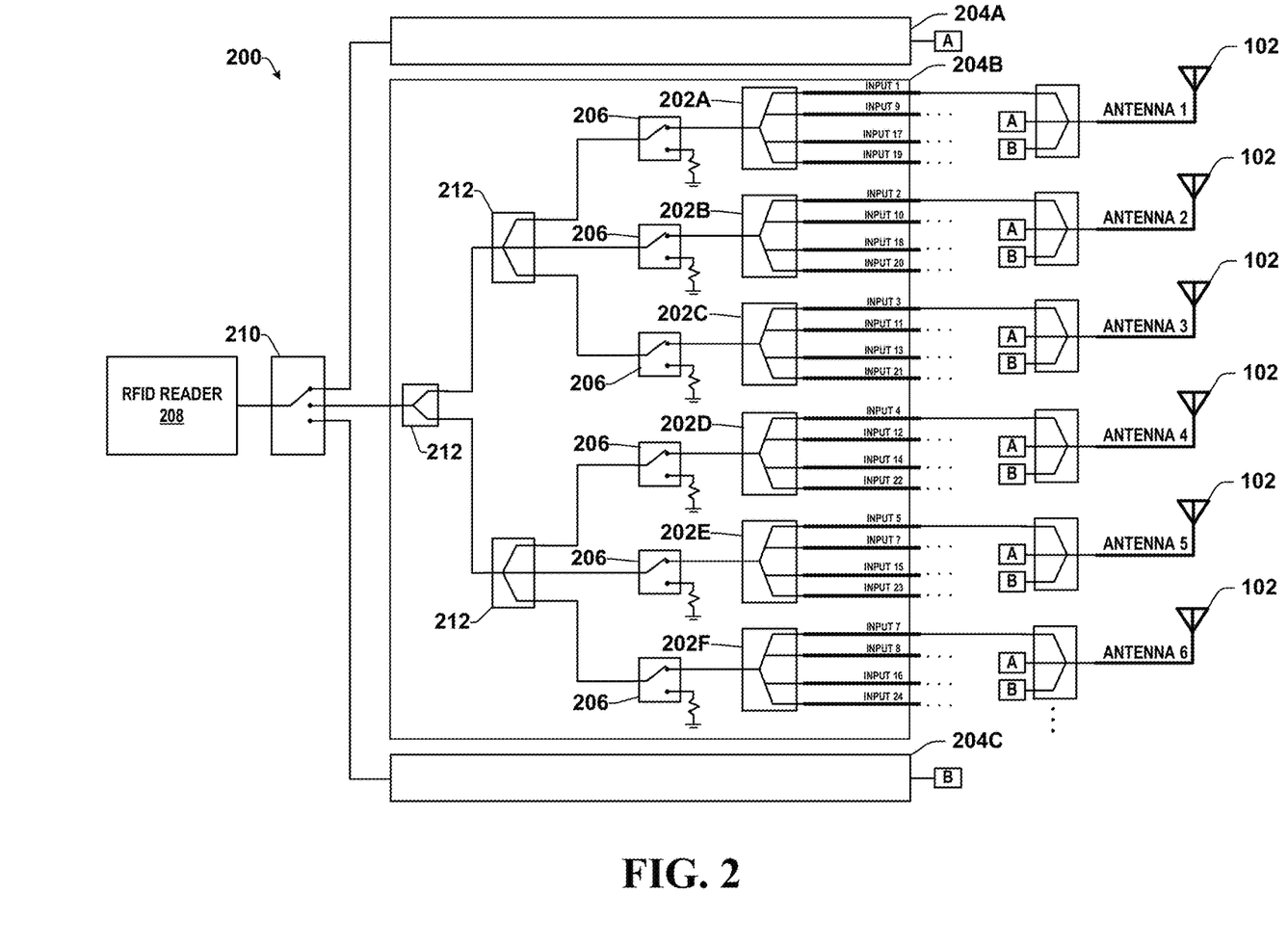
FIGS. 2 and 3 are example circuit diagrams of the circuitry driving the test interface operating in accordance with the teachings of this disclosure.
Figure 3:
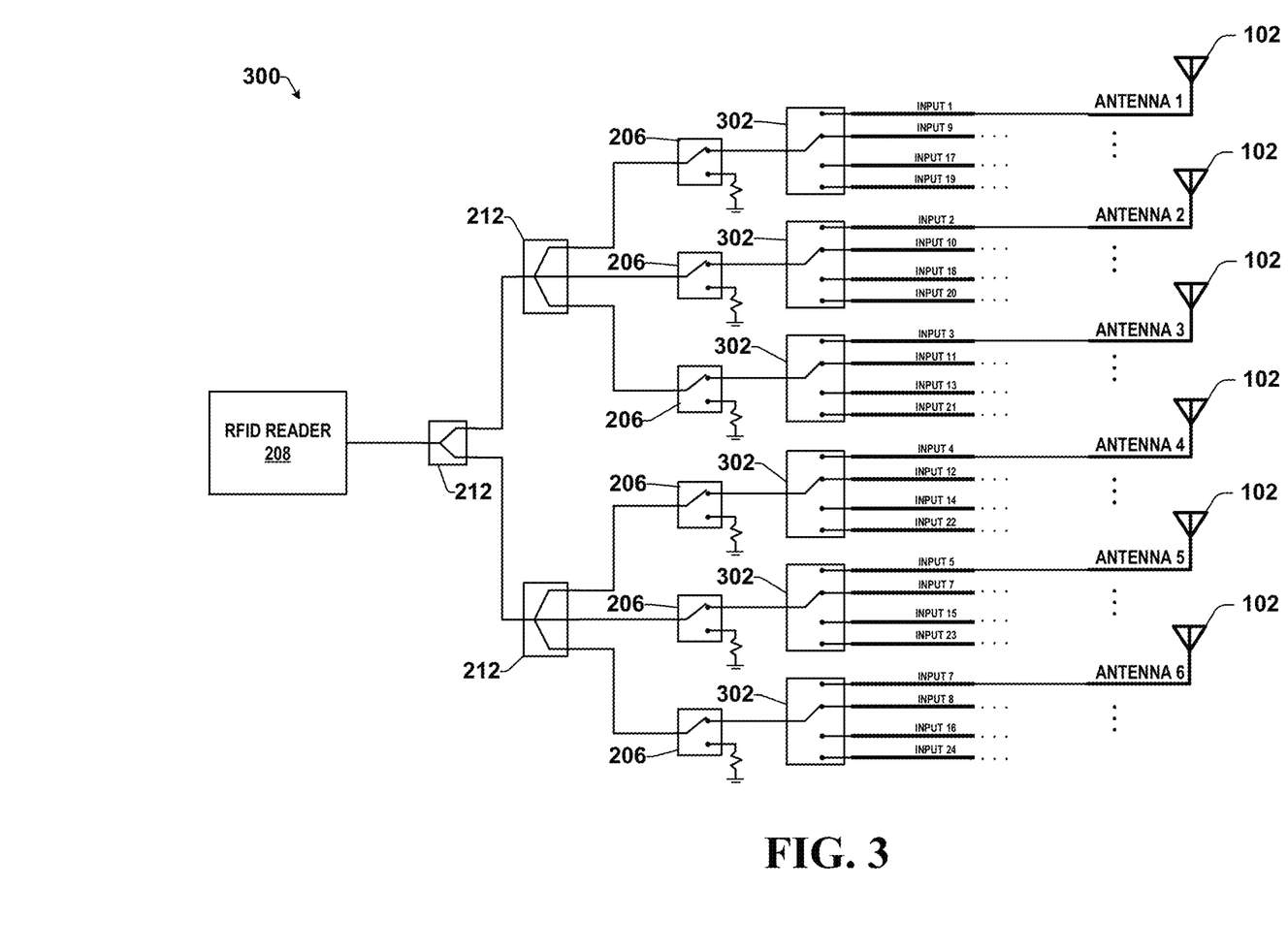

FIG. 1 illustrates an example test interface 100 with a test antenna 102 above or beneath each RFID inlay 104 to be tested. FIGS. 2 and 3 illustrate a block diagrams of the electronics 200 and 300 of the example test interface 100. The test interface 100 includes hardware (e.g., a housing, antennas, RFID reader(s), RF switches, RF summers, etc.) to test RFID inlays 104 that are moved into the test interface 100 as part of the manufacturing process. The test interface 100 may incorporate and/or be communicatively coupled a computing device (e.g., a workstation, a single-board computer, etc.) with software or firmware to control the hardware (e.g., as described below), to determine which of the RFID inlay 104 are defective (e.g., as described below) and/or control a marking device that physically marks the defective RFID inlays 104.

In the illustrated example, the RFID inlay 104 are tested in sets of twenty-four. In some examples, the test interface 100 causes all of the test antennas 102 to broadcast an Electronic Product Code (EPC) Query from the reader to all twenty-four antennas at a test frequency and test power level (sometimes referred to as a "test frequency/power level pair"). Testing all of the RFID inlays 104 in this manner is sometimes referred to as "screening scan" at the test frequency/power level pair. The test interface 100 may repeat these screening scans multiple times using different test frequency/power level pairs. For each screening scan, if all expected unique EPCs (e.g., twenty-four EPCs) are successfully read, then all the RFID inlays 104 have passed the test requirement with that test frequency/power level pair. If fewer than the expected unique EPCs are returned, then investigative scans are conducted by querying predefined subsets of the RFID inlays 104 separately. Each subset contains a different combination of RFID inlays 104 being tested such that no two subsets contain the same inlay pairings. In some examples, for twenty-four RFID inlays 104, the test interface 100 may test twenty-four subsets of four RFID inlays 104 each. These subsets may be grouped into configurations, where no configuration contains the same RFID inlay 104 more than once. Example subsets, identified by which antenna 102 is testing which RFID inlay 104, are shown on Table 1 below.

TABLE 1

| Antenna Location (Numeric IDs) | | | |
|---|---|---|---|
| Config 1 | Config 2 | Config 3 | Config 4 |
| 1 | 1 | 1 | 1 |
| 8 | 10 | 9 | 11 |
| 15 | 14 | 17 | 16 |
| 22 | 23 | 19 | 20 |

TABLE 1-continued

| Antenna Location (Numeric IDs) | | | |
|---|---|---|---|
| Config 1 | Config 2 | Config 3 | Config 4 |
| 2 | 2 | 2 | 2 |
| 9 | 11 | 10 | 12 |
| 16 | 15 | 18 | 17 |
| 23 | 24 | 20 | 21 |
| 3 | 3 | 3 | 3 |
| 10 | 12 | 11 | 7 |
| 17 | 16 | 13 | 18 |
| 24 | 19 | 21 | 22 |
| 4 | 4 | 4 | 4 |
| 11 | 7 | 12 | 8 |
| 18 | 17 | 14 | 13 |
| 19 | 20 | 22 | 23 |
| 5 | 5 | 5 | 5 |
| 12 | 8 | 7 | 9 |
| 13 | 18 | 15 | 14 |
| 20 | 21 | 23 | 24 |
| 6 | 6 | 6 | 6 |
| 7 | 9 | 8 | 10 |
| 14 | 13 | 16 | 15 |
| 21 | 22 | 24 | 19 |

In some examples, subsets defined as not be comprised of any physically adjacent antenna 102 to reduce the potential of cross-talk and a false positive confirmation of a "good" RFID inlay 104. A subset fails when the test interface 100 receives less than the expected number of EPCs. The test interface 100 records a failure for all of the RFID inlays 104 where at least one fails to respond to the reader query. After the subsets are tested, the test interface 100 determines the RFID inlay(s) 104 that is/are responsible for the failure of the screening scan. In some examples, the "bad" inlay(s) is/are the RFID inlay(s) 104 that have the highest number of failure occurrences after switching through the subsets. In some examples, the "bad" inlay(s) is/are the RFID inlay(s) 104 that satisfy (e.g., are greater than or equal to) a threshold number of failures. The investigative scans may be repeated for different test frequency/test power pairs. A marking device subsequently marks (e.g., by placing an ink mark or a sticker, etc.) the RFID inlays 104 that have been determined to be "bad" in any one of the tests.

FIG. 2 illustrates an example circuit diagram to perform the set and subset tests as described above. In the illustrated example, each four-way power splitter 202A-F (collectively "power splitters 202") represents a subset to be tested. In the illustrated example, three configurations 204A, 204B, and 204C (collectively "configurations 204") of six subsets are shown. However, a fourth configuration 204 of an additional six subsets may also be includes to make a total of twenty-four subsets. Each of the configurations 204 include different sets of subsets that text the RFID inlays 104 in different combination. In the illustrated example of FIG. 2, only one configuration 204B is illustrated in detail for simplicity sake. However, the other configurations (e.g., configuration 204A and configuration 204B) also include the power splitters 202 that are configured in different combinations (e.g., as illustrated on Table 1 above). In the illustrated example, configuration 204B includes: (i) a first power splitter 202A electrically coupled to Antenna 1, Antenna 9, Antenna 17, and Antenna 19; (ii) a second power splitter 202B electrically coupled to Antenna 2, Antenna 10, Antenna 18, and Antenna 20; (iii) a third power splitter 202C electrically coupled to Antenna 3, Antenna 11, Antenna 13, and Antenna 21; (iv) a fourth power splitter 202D electrically coupled to Antenna 4, Antenna 12, Antenna 14, and Antenna 22; (v) a fifth power splitter 202E electrically coupled to Antenna 5, Antenna 7, Antenna 15, and Antenna 23; and (vi) a sixth power splitter 202F electrically coupled to Antenna 7, Antenna 8, Antenna 16, and Antenna 24.

In an example scenario using the test interface illustrated in FIGS. 1 and 2, assume the inlay beneath antenna #15 is "bad." When the initial test is conducted, only twenty-three of the twenty-four RFID inlays 104 respond to the EPC query. Starting with "Test Configuration 1," the system then cycles through six RF switches 206 only delivering an RF signal to a subset of four of the antennas simultaneously. An RFID reader 208 is connected to a multi-way RF switch 210 (e.g., a 3-way RF switch, a 4-way RF switch, etc.). The RF switch 210 is electrically connected to each of the configurations 204 to allow the RF reader 208 to read subsets of each of the configurations 204. Within each configuration 204, RF summers 212 are used couple the antennas to the output of the configuration 204 to be connected to the RF switch 210.

Assuming that the subsets are organized as shown on in the illustrated example of FIG. 2 (e.g., "Config 3" of Table 1 above), the fifth group of antennas connected to power splitter 202E includes #15, so only three of the four RFID inlays 104 would respond in this scenario. As a result, the test interface 100 stores that all four inlays are candidates as being the "bad" inlay (e.g., listed as having a failure). The test interface 100 switches through the other switch combinations and all respond. The system repeats this process with "Config 1," "Config 2," and "Config 4." The test interface 100 continues to record which antenna were energized when a read failure occurred. Table 2 below shows are summary of the subsets that had at least one failure.

TABLE 2

| | Testing Scorecard | | | |
|---|---|---|---|---|
| RF | Antenna Location (Numeric IDs) | | | |
| Switch No. | Config 1 | Config 2 | Config 3 | Config 4 |
| 1 | 1 | | | |
| | 8 | | | |
| | 15 | | | |
| | 22 | | | |
| 2 | | 2 | | |
| | | 11 | | |
| | | 15 | | |
| | | 24 | | |
| 3 | | | | |
| 4 | | | | |
| 5 | | | 5 | |
| | | | 7 | |
| | | | 15 | |
| | | | 23 | |
| 6 | | | | 6 |
| | | | | 10 |
| | | | | 15 |
| | | | | 19 |

As illustrated on Table 2 above, subsets that include the antenna associated with inlay #15 have been recorded as failures. In the illustrated example, because the subsets are defined to have unique combinations of inlays, the "bad" inlay should be present in four subsets. In this example scenario, as shown on Table 3 below, antenna 15 displays four failures.

TABLE 3

| Antenna ID | Number of Occurrences |
|---|---|
| 1 | 1 |
| 2 | 1 |
| 5 | 1 |
| 6 | 1 |
| 7 | 1 |
| 8 | 1 |
| 10 | 1 |
| 11 | 1 |
| 15 | 4 |
| 19 | 1 |
| 22 | 1 |
| 23 | 1 |
| 24 | 1 |

Accordingly, the system identifies inlay #15 as a "bad" inlay. While the example scenario assumes one "bad" inlay, multiple inlays may be "bad" such that multiple antennas are have enough failures to qualify as testing a "bad" inlay.

In a second example scenario, inlays under antennas 1, 2, 7, and 8 are "bad." After running the test sequence through the four Test Configurations with the six subsets, the "Test Scorecard" is shown on Table 4 below.

TABLE 4

| | Testing Scorecard | | | |
|---|---|---|---|---|
| RF | Antenna Location (Numeric IDs) | | | |
| Switch No. | Config 1 | Config 2 | Config 3 | Config 4 |
| 1 | 1 | 1 | 1 | 1 |
| | 8 | 10 | 9 | 11 |
| | 15 | 14 | 17 | 16 |
| | 22 | 23 | 19 | 20 |
| 2 | 2 | 2 | 2 | 2 |
| | 9 | 11 | 10 | 12 |
| | 16 | 15 | 18 | 17 |
| | 23 | 24 | 20 | 21 |
| 3 | | | | 3 |
| | | | | 7 |
| | | | | 18 |
| | | | | 22 |
| 4 | | 4 | | 4 |
| | | 7 | | 8 |
| | | 17 | | 13 |
| | | 20 | | 23 |
| 5 | | | 5 | 5 |
| | | | 8 | 7 |
| | | | 18 | 15 |
| | | | 21 | 23 |
| 6 | 6 | | | 6 |
| | 7 | | | 8 |
| | 14 | | | 16 |
| | 21 | | | 24 |

As shown on Table 5 below, the "bad" inlays are properly identified. From time to time, a false positive can occur when a "good" inlay is grouped with each of the "bad" inlays in all of the subsets. However, an occasional false positive is tolerable to prevent false negatives. An example (and unlikely) scenario to illustrate is when there is one "good" inlay among the twenty-four inlays in the test cycle. The "good" inlay will always be among groups of "bad" inlays, receive the same scoring and is assumed "bad".

TABLE 5

| Test Interface ID | Number of Occurrences |
|---|---|
| 1 | 4 |
| 2 | 4 |
| 3 | 1 |
| 4 | 2 |
| 5 | 2 |
| 6 | 2 |
| 7 | 4 |
| 8 | 4 |
| 9 | 2 |
| 10 | 2 |
| 11 | 2 |
| 12 | 1 |
| 13 | 1 |
| 14 | 2 |
| 15 | 3 |
| 16 | 3 |
| 17 | 3 |
| 18 | 3 |
| 19 | 1 |
| 20 | 3 |
| 21 | 3 |
| 22 | 2 |
| 23 | 2 |
| 24 | 2 |

In some examples, the test interface 100 tests each of the RFID inlays 104 individually through the use of RF switches. FIG. 3 illustrates an example circuit 300 of a frequency testing interface that tests each of the RFID inlays 104 individually through the use of RF switches 206 and 302. The query signal from the RFID reader 208 is split until it reaches the RF switches 206, which switches the query signal between individual antenna RF switch 302. That is, only one of the RF switches 206 is not switched to ground at a time. The RF switches 206 that is not switched facilitates the ground individual antenna RF switch 302 cycling between individual antenna 102 (and thus each RFID inlay 104). The RF switches 206 are cycled until each antenna 102 is queried. The switching speeds for electronic RF switches is in the several microsecond range, the majority of the time is the reader-inlay query (30 to 50 ms each).

Typical production yields on inlays are generally greater than 99.5%. If there are twenty-four RFID inlays 104 per test cycle, a single inlay will fail on average every 8 test cycles. The time required for a testing system with moving parts (as described above) is approximately 6 seconds/test cycle×8 test cycles=48 seconds. Using the test interface as described above with no moving parts, testing the set and, if there is a failure, the subsets, is shown on Table 6 below.

TABLE 6

| 7 Test Cycles with no "Bad" Inlays | | 7 test cycles * (0.050 second/test * 24 tests) |
|---|---|---|
| 1 Test Cycle with at least on "Bad" Inlay | + | 1 test cycle * (0.050 second/test * 24 tests) |
| | + | 6 subsets * (0.050 seconds/test * 4 configurations) |
| Total | | 10.8 seconds |

Because, in some examples, the test as described herein may be repeat for multiple test frequency-test power pairs (as described below), assuming three pairs are testing, the total testing time would approximately be 32.4 seconds.

During the manufacturing process, test systems have traditionally used a single test frequency for determining the inlay quality. This approach is acceptable when trying to ascertain whether the inlay is "alive" or "dead", but it doesn't identify inlays that may have a sub-region where the RF performance is below an acceptable value or that of the normal inlay population. The test system described here qualifies the inlay performance over the entire band of operation (860 to 960 MHz) by performing tests at several discrete frequencies. The test system uses an RFID reader capable of being operated in a fixed frequency mode and at various transmit power settings. The reader drives a feed network (e.g., the feed networks illustrated in FIGS. 2 and 3). This network feeds the RF signal to each of the individual antennas. The antennas can be a near-field or far-field device which delivers a suitable plane wave to the inlay under test. The antennas have reasonably uniform response, both in amplitude and phase across the operational test frequency band. The test system includes a device for initiating the test sequence (sometimes referred to as "triggering"). This device could be, but is not limited to an optical device which detects the leading edge of a registration mark or antenna feature on the inlay. A marking system is also incorporated for marking the inlays which fail the quality test criteria (frequency and RF power level).

The test frequencies can be chosen anywhere within the 860 to 960 MHz frequency band and may be different depending on the inlay's design or application. Test frequencies are typically chosen based on data obtained during the inlay development process. Sub-regions within the band with lower than normal performance may be identified and provides a meaningful test frequency.

Figure 4:
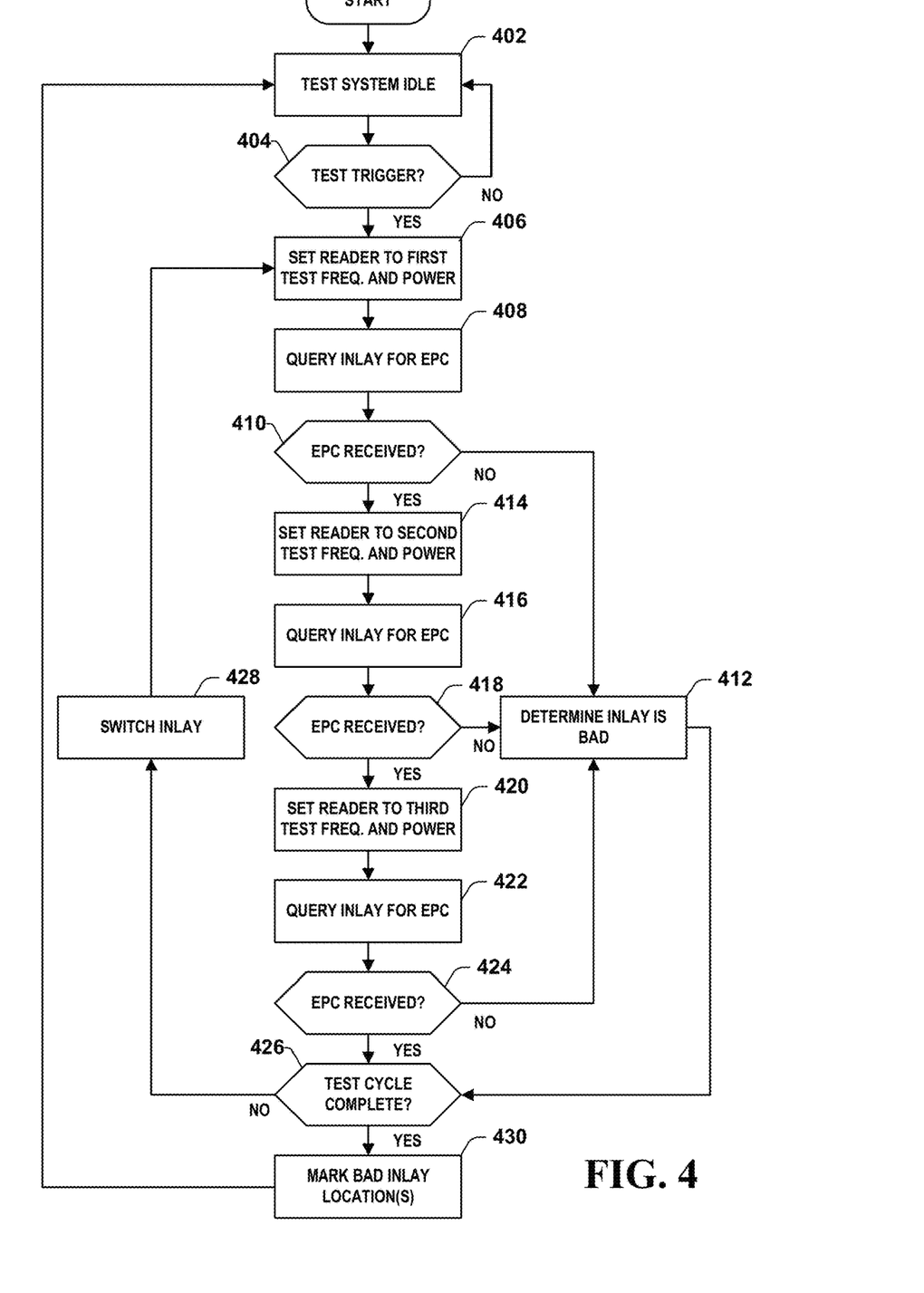
FIGS. 4, 5, and 6 are flowcharts of example methods to detect faulting RFID inlays in accordance with the teachings of this disclosure.
Figure 5:
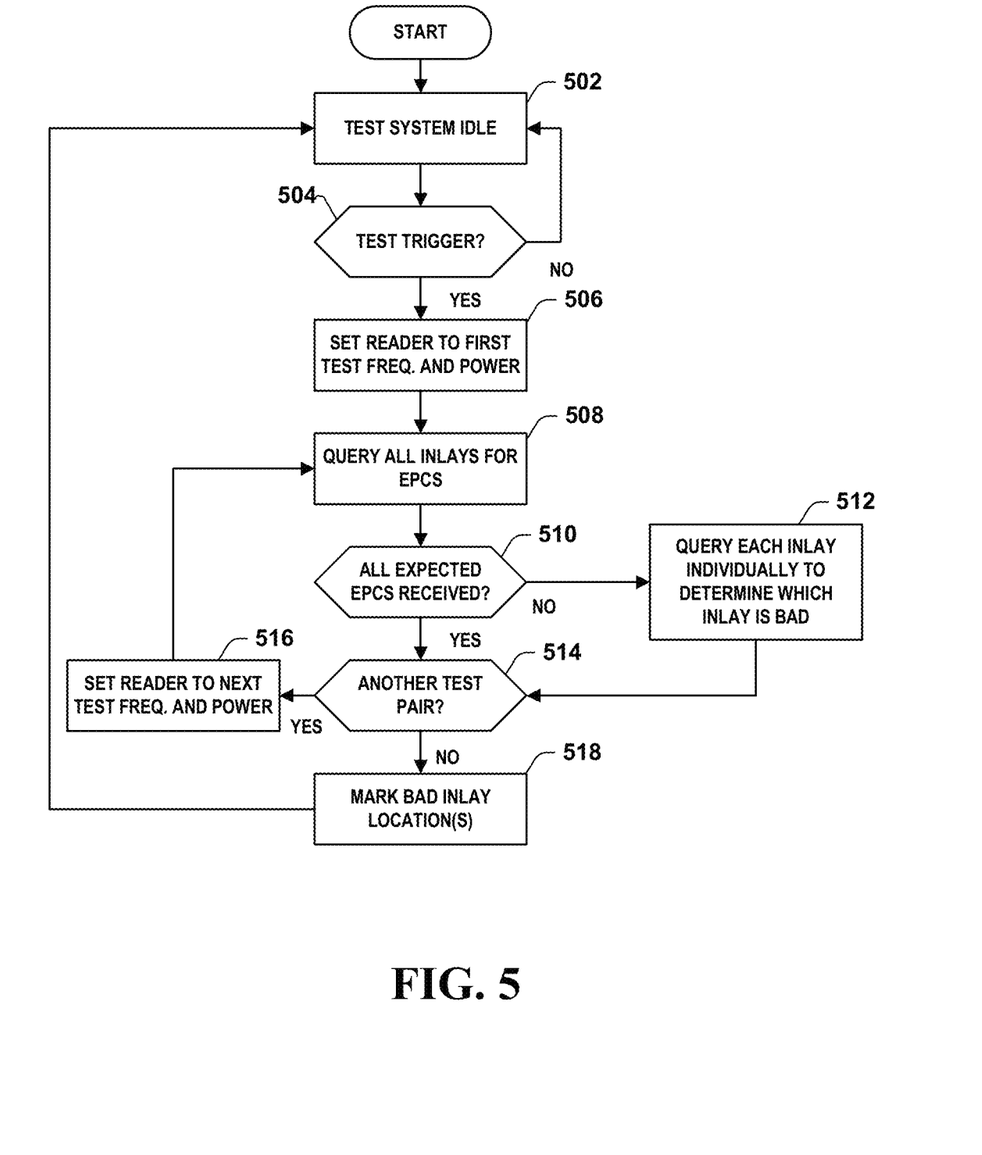
Figure 6:
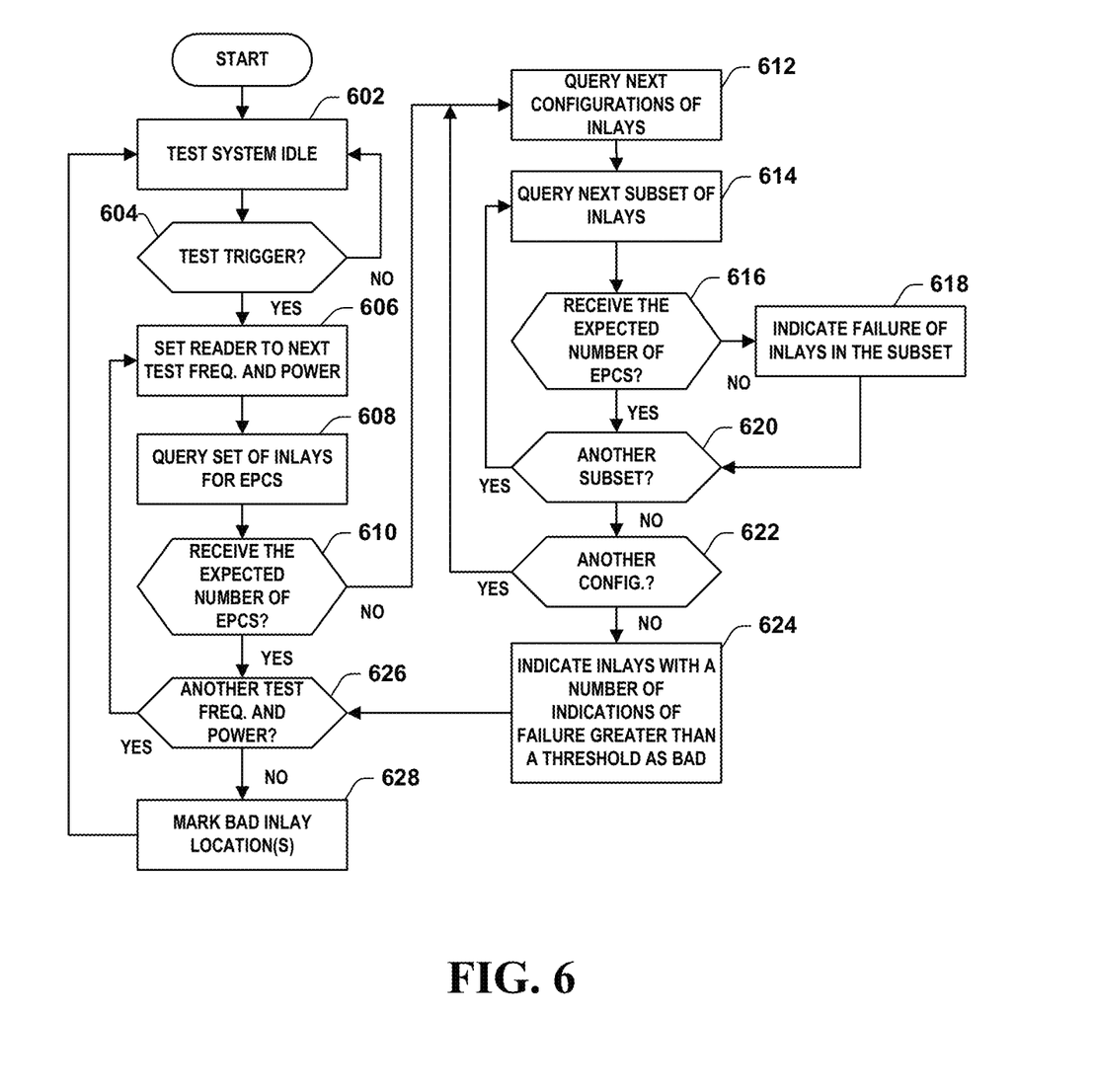

FIGS. 4, 5, and 6 illustrate example methods to test the RFID inlays 104. FIG. 4 illustrated testing RFID inlays 104 using multiple test frequency-test power pairs that may be used in conjunction with, for example the circuit 300 illustrated in FIG. 3. Initially, the test interface 100 is idle (e.g., while a sheet of the RFID inlays 104 is being moved into position, etc.) (block 402). The test interface 100 waits until a test is triggered (block 404). For example, a test may be triggered when a new set of the RFID inlays 104 to be tested are moved and positions proximate the test antennas 102. After the test is triggered ("YES" at block 404), the test interface 100 sets the RFID reader 208 to a first test frequency-test power pair (block 406). The test interface 100 queries the target one of the RFID inlays 104 for its EPCs (block 408). The test interface 100 determines whether the EPC is received (block 410). When the EPC is not received ("NO" at block 410), test interface 100 determines that the corresponding RFID inlay 104 is bad (block 412).

When the EPC is received ("YES" at block 410), the test interface 100 sets the RFID reader 208 to a second test frequency-test power pair (block 414). The test interface 100 queries the RFID inlays 104 for its EPCs (block 416). The test interface 100 determines whether the EPC is received (block 418). When the EPC is not received ("NO" at block 418), test interface 100 determines that the corresponding RFID inlay 104 is bad (block 412).

When the EPC is received ("YES" at block 418), the test interface 100 sets the RFID reader 208 to a third test frequency-test power pair (block 420). The test interface 100 queries the RFID inlays 104 for its EPCs (block 422). The test interface 100 determines whether the EPC is received (block 424). When the EPC is not received ("NO" at block 424), test interface 100 determines that the corresponding RFID inlay 104 is bad (block 412).

When the test interface 100 either (a) determines that the EPC is received at the third test frequency-test power pair ("YES" at block 424) or (b) the test interface 100 determines that the corresponding RFID inlay 104 is bad (block 412), the test interface 100 determines whether the test cycle is complete (block 426). For example, the test cycle is complete when all twenty-four of the RFID inlays 104 in a test batch have been tested and is not complete when all twenty-four of the RFID inlays 104 in the test batch not have been tested. When the test cycle is not complete ("NO" at block 426), the testing interface 100 switches to the next target one of the RFID inlays 104 (e.g., as described in connection with FIG. 3 above) (block 428). When the test cycle is complete ("YES" at block 426), the testing interface 100 marks the bad RFID inlays 104 (block 430) and the test interface returns to idle (block 402).

As illustrated in FIG. 5, when the system is triggered, the reader tests all inlays in the field of view at each of the specified test frequencies and transmit power levels that may be used in conjunction with, for example the circuit 300 illustrated in FIG. 3. Initially, the test interface 100 is idle (e.g., while a sheet of the RFID inlays 104 is being moved into position, etc.) (block 502). The test interface 100 waits until a test is triggered (block 504). For example, a test may be triggered when a new set of the RFID inlays 104 to be tested are moved and positions proximate the test antennas 102. After the test is triggered ("YES" at block 504), the test interface 100 sets the RFID reader 208 to a first test frequency-test power pair (block 506). The test interface 100 queries all of the RFID inlays 104 being tested (block 508). The test interface determines whether EPCs were received for all of the RFID inlays 104 being tested (block 510). If not all of the EPCs were received for all of the RFID inlays 104 being tested ("NO" at block 510), the test interface 100 queries each of the RFID inlays 104 being tested individually (e.g., as described above in conjunction with FIG. 3 above) to determine which of the of the RFID inlays 104 is/are bad (block 512).

If all of the EPCs were received for all of the RFID inlays 104 being tested ("YES" at block 510), the test interface 100 determines whether to test another test frequency-test power pair (block 514). For example, the test interface 100 may be programmed to test a predetermined set of test frequency-test power pairs. If another test frequency-test power pair is to be tested ("YES" at block 514), the test interface 100 sets the RFID reader 208 to the next test frequency-test power pair (block 516) and queries all of the RFID inlays 104 being tested at that test frequency-test power pair (block 508). If another test frequency-test power pair is not to be tested ("NO" at block 514), the testing interface 100 marks the bad RFID inlays 104 (block 518) and the test interface returns to idle (block 502).

FIG. 6 illustrates an example to test a set of inlays 104 and, upon detecting at least one failure, multiple subsets of inlays using, for example, the circuit 200 illustrated in FIG. 2 above. Initially, the test interface 100 is idle (e.g., while a sheet of the RFID inlays 104 is being moved into position, etc.) (block 602). The test interface 100 waits until a test is triggered (block 604). For example, a test may be triggered when a new set of the RFID inlays 104 to be tested are moved and positions proximate the test antennas 102. After the test is triggered ("YES" at block 604), the test interface 100 sets the RFID reader 208 to a first test frequency-test power pair (block 606). The test interface 100 queries all of the RFID inlays 104 being tested (block 608). The test interface determines whether EPCs were received for all of the RFID inlays 104 being tested (block 610).

If not all of the EPCs were received for all of the RFID inlays 104 being tested ("NO" at block 610), the test interface 100 begins queries for a configuration of the RFID inlays 104 (e.g., "Config 1" of Table 1 above) (block 612).

The test interface 100 queries the first subset of the RFID inlays 104 in the configuration (block 614). The test interface 100 determines whether it received the expected number (e.g., from all of the RFID inlays 104 in the subset, etc.) of EPCs (block 616). When the test interface 100 does not receive the expected number of EPCs ("NO" at block 616), the test interface 100 records all of the RFID inlays 104 in the subset as having a failure (block 618).

When the test interface 100 receives the expected number of EPCs ("YES" at block 616), the test interface 100 determines if there is another subset to test (block 620). If there is another subset to test ("YES" at block 620), the test interface 100 queries the next subset of the RFID inlays 104 in the configuration (block 614). If there is not another subset to test ("NO" at block 620), the test interface 100 determines whether there is another configuration to test (block 622). If there is another configuration to test ("YES" at block 622), the test interface 100 begins queries for the next configuration of the RFID inlays 104 (block 612). If there is not another configuration to test ("NO" at block 622), the test interface 100 determines which RFID inlays 104 are bad based on the number of time it was recorded as having a failure (block 624). In some examples, the test interface 100 determines a particular RFID inlay 104 was bad when the number of time it was recorded as having a failure is greater than a threshold number of failures.

The test interface 100 determines whether to test another test frequency-test power pair (block 626). For example, the test interface 100 may be programmed to test a predetermined set of test frequency-test power pairs. If another test frequency-test power pair is to be tested ("YES" at block 626), the test interface 100 sets the RFID reader 208 to the next test frequency-test power pair (block 606) and queries all of the RFID inlays 104 being tested at that test frequency-test power pair (block 608). If another test frequency-test power pair is not to be tested ("NO" at block 626), the testing interface 100 marks the bad RFID inlays 104 (block 628) and the test interface returns to idle (block 602).

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define an introducing device and/or introducing system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

Having thus described the invention, the following is claimed:

1. A test system comprising:
a test interface without moving parts, the test interface comprising:
an array of antennas,
a radio frequency identification (RFID) reader to interrogate an array of RFID inlays to be tested; and
a circuit configured to selectively connect the RFID reader to the antenna in the array of antennas;
wherein the test interface performs a testing sequence comprising a primary scan of all of the RFID inlays in the array of RFID inlays to be tested and, when not all of the RFID inlays in the array of RFID inlays respond, a secondary scan to interrogate a subset of the RFID inlays in the array of RFID inlays to determine which of the RFID inlays failed to respond; and
a marking device to mark any of the identified RFID inlays that failed to respond.

2. The test system of claim 1, wherein the array of antennas is a two-dimensional array of antennas.

3. The test system of claim 1, wherein the array of antennas includes twenty-four antennas.

4. The test system of claim 1, wherein to perform the secondary scan, the test interface interrogates multiple subsets of the RFID inlays to be tested.

5. The test system of claim 4, wherein the subsets are categorized into four configurations, wherein each antenna is used once in each of the configurations.

6. The test system of claim 5, wherein each of the configurations includes multiple subsets, each of the subsets including four of the antenna to be used to interrogate the RFID inlays to be tested.

7. The test system of claim 6, wherein none of the subsets across all of the configurations include identical combinations of the antenna.

8. The test system of claim 4, wherein, for each subset, the test interface records all of the RFID inlays in the subset as having a failure when not all of the RFID inlays in the subset respond.

9. The test system of claim 8, wherein, for each of the RFID inlays to be tested, the test interface determines which of the RFID inlays failed to respond by:
comparing a number of times the RFID inlay has been recorded as having a failure to a failure threshold; and
determining that the RFID inlay has failed to respond when the number of times the RFID inlay has been recorded as having a failure meets or exceeds the failure threshold.

10. The test system of claim 1, wherein to perform the secondary scan, the test interface interrogates each RFID inlay to be tested individually.

11. The test system of claim 1, wherein the testing sequence is performed with the RFID reader set at a first frequency-power level pair, and wherein the test interface repeats the testing sequence with the RFID reader set at a second frequency-power level pair, the second frequency-power level pair being different than the first frequency-power level pair.

12. The test system of claim 11, wherein the test interface repeats the query with the RFID reader set at a third frequency-power level pair, the third frequency-power level pair being different than the first and the second frequency-power level pairs.

13. A method to test radio frequency identification (RFID) inlays, the method comprising:
moving an array of RFID inlays to be tested into a test interface including an array of antennas;
performing, by the test interface, a primary scan of all of the RFID inlays in the array of RFID inlays to be tested without moving any of the antennas and without associating any response from the RFID inlays to any of the antennas;
in response to receiving responses from all of the RFID inlays in the array of RFID inlays to be tested, determining that all of the RFID inlays to be tested are functional;
in response to receiving responses from less than all of the RFID inlays in the array of RFID inlays to be tested; performing a secondary scan of a subset of RFID inlays in the array of RFID inlays to determine which of the RFID inlays are defective; and
marking the RFID inlays that are defective.

14. The method of claim 13, wherein performing the secondary scan comprises individually interrogating each of the RFID inlays to be tested to determine which of the RFID inlays are defective.

15. The method of claim 13, wherein performing the secondary scan comprises interrogating multiple subsets of the RFID inlays to be tested to determine which of the RFID inlays are defective, each of the subsets including multiple of the RFID inlays to be tested.

16. The method of claim 15, wherein none of the subsets include a same combination of the RFID inlays to be tested as any other subset.

17. The method of claim 15, wherein after interrogating each of the multiple subsets of the RFID, recording all of the RFID inlays in the subset as having a failure when the testing interface does not receive responses from all of the RFID inlays in the subset.

18. The method of claim 17, wherein, for each the RFID inlay, determining which of the RFID inlays are defective comprises:
comparing a number of times the RFID inlay has been recorded as having a failure to a failure threshold; and
determining that the RFID inlay is defective when the number of times the RFID inlay has been recorded as having a failure meets or exceeds the failure threshold.

19. The method of claim 17, wherein determining which of the RFID inlays are defective comprises:
determining a highest number of times that any one of the RFID inlays has been recorded as having a failure; and
for each of the RFID inlays, determining that the RFID inlay is defective when the number of times the RFID inlay has been recorded is equal to the highest number.

20. The method of claim 13, wherein the array of antennas is a two-dimensional array.

21. The method of claim 13, wherein the query of all the RFID inlays in the array is performed with an RFID reader set at a first frequency-power level pair, and wherein the test interface repeats the query with the RFID reader set at a second frequency-power level pair, the second frequency-power level pair being different than the first frequency-power level pair.

22. The method of claim 21, wherein the query is performed with the RFID reader set at a third frequency-power level pair, the third frequency-power level pair being different than the first and the second frequency-power level pairs.

23. A method comprising:
moving radio frequency identification (RFID) labels to be tested into a test interface that includes a two-dimensional array of antennas;
performing, by the test interface, a query of all of the RFID labels to be tested without moving any of the antennas and without associating any response from the RFID labels to any of the antennas;
in response to receiving responses from all of the RFID labels to be tested, determining that all of the RFID labels to be tested are not defective;
in response to receiving responses from less than all of the RFID labels to be tested:
interrogating multiple subsets of the RFID labels to be tested to determine which of the RFID labels are defective, each of the subsets including multiple of the RFID labels to be tested;
for each of the subsets for which the test interface does not receive responses from all of the RFID labels in the subset, recording all of the RFID labels in the subset as having a failure;
after all of the subsets are tested, comparing a number of times the RFID label has been recorded as having a failure to a failure threshold, and determining that the RFID label is defective when the number of times the RFID label has been recorded as having a failure meets or exceeds the failure threshold; and
marking the RFID labels that are defective.

* * * * *